Nov. 18, 1930. H. H. WANDERS 1,781,741
HEATING PAD
Filed Nov. 15, 1928
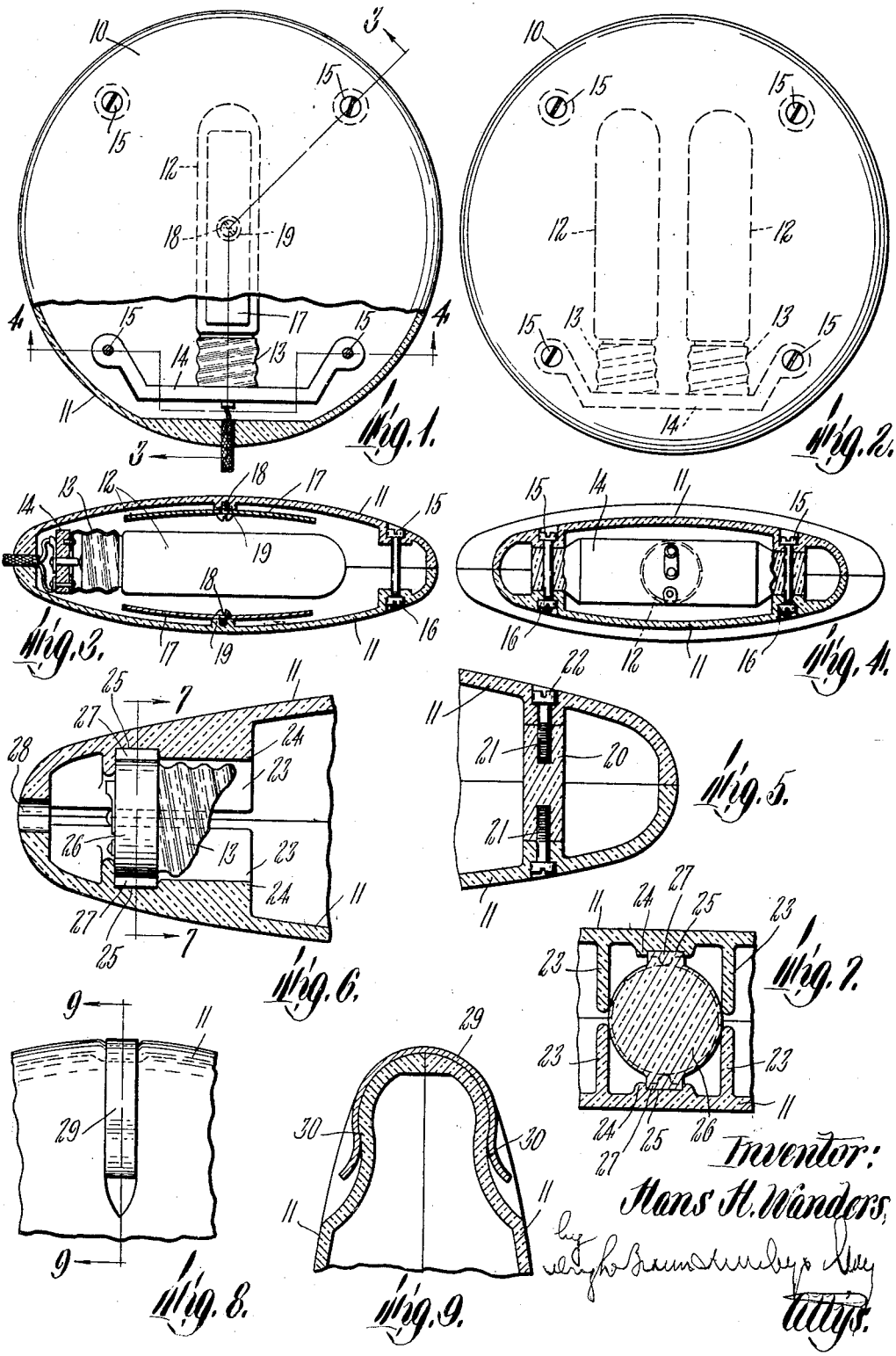
Inventor:
Hans H. Wanders Patented Nov. 18, 1930

1,781,741

UNITED STATES PATENT OFFICE

HANS H. WANDERS, OF BOSTON, MASSACHUSETTS

HEATING PAD

Application filed November 15, 1928. Serial No. 319,461.

This invention relates to a portable heating unit for supplying heat at moderate temperatures such as are suitable for local application to the human body. My improved heating unit is intended for use in place of the well known "hot water bag", an object of the invention being to provide a unit which will supply a continuous and regulable heat, is simple in structure, and is economical both as to first cost and operation.

In carrying out the invention, I provide a hollow casing of suitable shape and material, and mount therein one or more incandescent electric lamps. The heat from the lamp is conducted through the wall of the casing and is regulated by controlling the current flowing through the lamp filament. For convenience in use, the unit may be made relatively flat in shape, a lamp of suitable shape being provided for the space within the casing. For a more complete understanding of the invention, reference is had to the description which follows, and to the drawing, of which:

Figure 1 is a side elevation of an embodiment of the invention, a portion being broken away.

Figure 2 is a similar elevation showing a heating pad with two lamps therein.

Figure 3 is a section on the line 3—3 of Figure 1.

Figure 4 is a section on the line 4—4 of Figure 1.

Figure 5 is a fragmentary section showing an alternative way of securing the casing members together.

Figure 6 is a fragmentary section of a modified form of the invention.

Figure 7 is a section on the line 7—7 of Figure 6.

Figure 8 is a fragmentary elevation showing different means for securing the casing parts together.

Figure 9 is a section on the line 9—9 of Figure 8.

Referring to the drawing in detail, the invention may be embodied in a hollow casing or shell 10 which may be of any convenient shape but is preferably somewhat flat. As shown on the drawing the casing may be of circular shape and may be formed of a pair of dished parts 11 secured together with their rims abutting. Within the hollow space enclosed by the casing 10 I may mount one or more incandescent lamps 12 by which the pad is heated, these lamps being preferably of the carbon filament type. The casing 10 may be of any suitable material such as metal or a moldable plastic such as bakelite, the plastic used for this purpose being preferably an electrical insulating material unaffected by heat. In order to support the lamp or lamps 12 I may provide a corresponding number of sockets 13 which may be mounted on a suitable support 14. This support is preferably made of insulating material and is fixed between the parts 11 when the pad is assembled for use. As indicated in Figures 1 and 4, the support 14 may have perforated ends the perforations of which are adapted to register with opposite perforations in the casing parts 11. Suitable bolts 15 and nuts 16 may be employed to secure together the members 11 and the support 14, as shown in Figure 4. This results in a simple, easily assembled heating pad which is efficient and economical.

In order to avoid hot spots at the central portions of the side faces of the pad due to the fact that the heat emitting filament of the lamp is nearest to these portions of the casing 10, I may interpose a pair of heat-distributing plates 17, these plates being near to but spaced from the respective casing parts 11, and may be mounted on these respective parts as by a screw 18 passing through each plate 17 and threaded into a boss 19 on each casing part 11. These plates 17 intercept part of the rays from the lamp and serve to equalize the heat from the lamp over the surface of the casing. The plates 17 may be of metal, bakelite, or any other suitable substance. Instead of bolts 15 passing through the casing from one side to the other, I may employ spacing elements 20 as illustrated in Figure 5, these elements being provided with threaded holes 21 to receive the ends of suitable screws 22. The heads of the latter are preferably countersunk into the outer surface of the casing parts 11 and engage the spacing piece 20 so as to secure their respective casing parts 11 thereto.

In Figures 6 and 7 is illustrated a modified arrangement of lamp support and casing members. Each casing member is formed with a pair of spaced fins 23 and a lug 24 having a shallow slot 25. The lamp base support 26 is suitably shaped to fit between the fins 23 and is provided with a pair of lugs 27 which fit snugly in the slots 25. The casing members are easily assembled with the lamp base support as shown in Figure 7, the lamp base being previously connected to a suitable drop cord which may be passed through an opening 28 in the edge of the casing, this opening being formed by complementary semi-cylindrical grooves in the casing parts. By making the casing members of electrical insulating material such as bakelite, the possibility of a short circuit between the elements of the lamp socket may be obviated. Instead of using bolts and nuts or screws to secure the parts of the casing together, I may employ spring clips 29 such as are illustrated in Figures 8 and 9. In order to avoid undesirable projections from the smooth surface of the pad, I may recess the outer surface of the casing members as at 30 to receive the spring clips 29. Any desired number of such clips, preferably four, may be provided, these clips being suitably spaced about the peripheral edge of the pad.

Having thus described an embodiment of this invention it should be evident to those skilled in the art that various changes and modifications might be made therein without departing from its spirit or scope as defined by the appended claims.

I claim:

1. A device of the class described comprising a two-part shell of moldable electrical insulating material, an electric light socket therein, each part of said shell having portions projecting inwardly and cooperating to grip said socket when the shell is assembled, and means for securing said parts together.

2. In a heating pad, a hollow casing comprising two circular dished parts of molded electrical insulating material, said parts having mutually abutting rims and inwardly extending portions cooperating to receive an electric light socket in closely fitted engagement, and means for securing said parts together.

In testimony whereof I have affixed my signature.

HANS H. WANDERS.